United States Patent [19]

Wilhelmy

[11] Patent Number: 4,704,916
[45] Date of Patent: Nov. 10, 1987

[54] SELECTOR SHAFT RETURN GUIDE FOR A MULTIPLE SPEED TRANSMISSION

[75] Inventor: Egon Wilhelmy, Bad Honnef, Fed. Rep. of Germany

[73] Assignee: Ford Motor Company, Dearborn, Mich.

[21] Appl. No.: 908,834

[22] Filed: Sep. 18, 1986

[30] Foreign Application Priority Data

Feb. 6, 1986 [DE] Fed. Rep. of Germany ....... 3603609

[51] Int. Cl.$^4$ .............................................. G05G 5/06
[52] U.S. Cl. ...................................................... 74/475
[58] Field of Search ........................... 74/475, 476, 527

[56] References Cited

U.S. PATENT DOCUMENTS

| | | | |
|---|---|---|---|
| 3,106,851 | 10/1963 | Ivanchich | 74/475 X |
| 4,297,910 | 11/1981 | Myers | 74/475 X |
| 4,338,828 | 7/1982 | Ruhlman | 74/475 |
| 4,483,213 | 11/1984 | Takahashi | 74/475 |
| 4,569,247 | 2/1986 | Inui et al. | 74/475 |
| 4,633,728 | 1/1987 | May | 74/476 |

FOREIGN PATENT DOCUMENTS

| | | |
|---|---|---|
| 710619 | 9/1941 | Fed. Rep. of Germany. |
| 2935590 | 12/1981 | Fed. Rep. of Germany. |
| 2037916 | 7/1980 | United Kingdom ................. 74/475 |

*Primary Examiner*—Allan D. Hermann
*Attorney, Agent, or Firm*—Frank G. McKenzie; Donald J. Harrington

[57] ABSTRACT

A selector shaft return guide for a multiple speed automotive transmission includes a selector shaft for selecting the gear shift channel; a lever member rotatably fixed to the selector shaft; a holding member axially displaceable relative to the selector shaft and fixed rotatably to the casing; and a spring that forces the holding member against the lever. The lever member is formed with two tracks, offset angularly and having a depth that varies in a peripheral direction. Balls located in the tracks between the holding member and the lever member travel within the groove against the force produced by the spring that urges the selector shaft to return to the neutral position.

6 Claims, 3 Drawing Figures

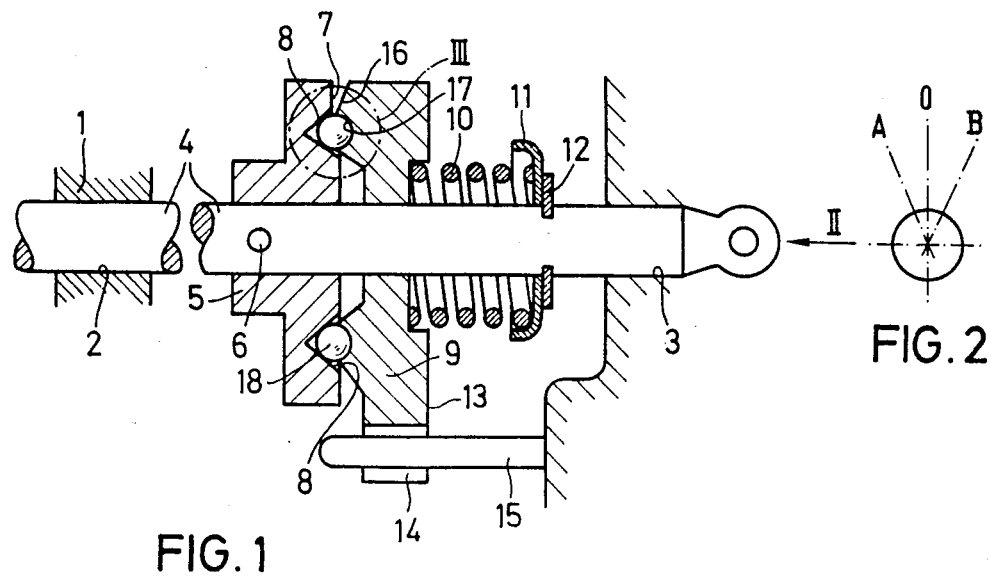
FIG. 1
FIG. 2
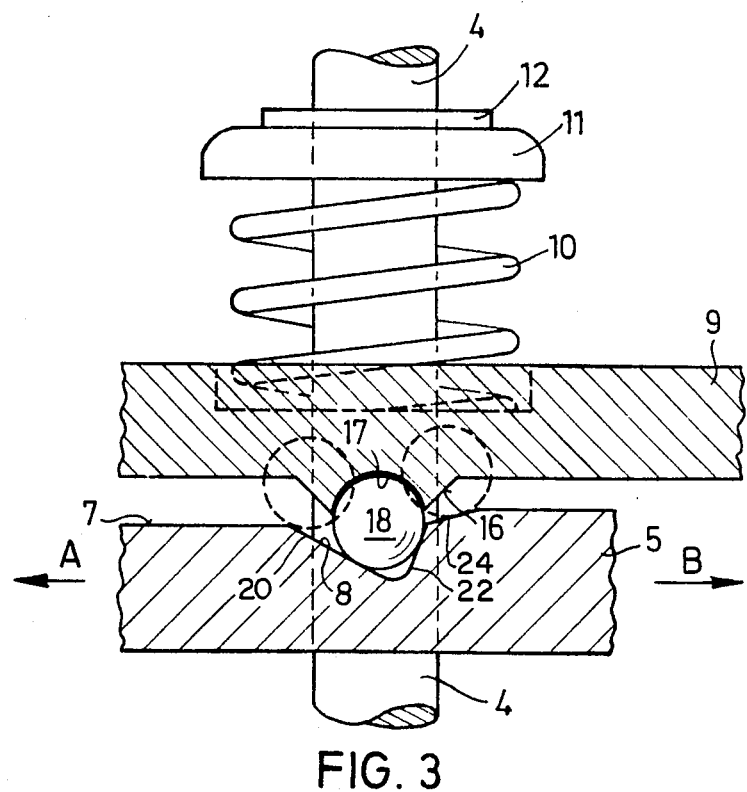
FIG. 3

SELECTOR SHAFT RETURN GUIDE FOR A MULTIPLE SPEED TRANSMISSION

BACKGROUND OF THE INVENTION

1. Field of the Invention.

This invention relates to the field of manual transmissions for motor vehicles and more particularly pertains to the gear selector mechanism for such transmissions.

2. Description of the Prior Art.

The selector return guide for a multiple speed automotive transmission is known from German Offenlegungsschrift No. 2935590. The device described in that application includes a selector shaft, which is rotatably mounted for preselecting the shift rails and axially displaceable for engaging the gear. The lever member is rotatably fixed to the selector shaft and cooperates with the free legs of a spring secured to the transmission casing to guide the selector shaft back to its neutral position.

This selector shaft return guide has the disadvantage in that it requires a separate ball catch arrangement to distinguish the selector gear shift rails by determining the different efforts required to preselect the various gears.

The selector shaft return guide for a multiple speed transmission for motorcycles is known from German Patent No. 710699. The device described in that patent includes a selector shaft, rotatably mounted for engaging the gears and rotatably fixed to a lever member, which cooperates with a spring and holding member, displaceable relative to the selector shaft but held in a nonrotatable manner on the transmission casing, to guide the selector shaft back to a neutral position. The selector shaft return guide described in the patent does not guide the selector shaft into a neutral position from different gear shift channels; therefore, it cannot distinguish different gear shift channels by indicating varying levels of effort required.

SUMMARY OF THE INVENTION

An object of this invention is to provide an improved selector shaft return guide that not only reliably guides the selector shaft return from preselected gear shaft channels back into the neutral position, but also, because of different preselected forces to be overcome when preselecting the various gear shift channels, distinguishes clearly the gear shift channels selected in each case. It is particularly desirable that the vehicle operator be able to distinguish the reverse gearshift channel from the overdrive gear shift channels and the overdrive gearshift channel from the other forward drive channels.

The device according to this invention includes a lever member pinned to a flanged surface having two grooved tracks that are diametrically offset. Each track has a different slope in each opposite peripheral direction. A holding member, which is acted upon axially by a spring and held rotationally rigid by a radial slot and a pin secured to the transmission casing, holds in a raised flange cup portion balls which are arranged rotatably to roll in the grooved tracks. The amount of effort used to select a gearshift channel can be predetermined by varying the slope of the track in the peripheral directions. In this way, the operator is given a clear indication of the gearshift channel selected because the effort required to be overcome to move the balls within the tracks differs with the slopes of the tracks.

BRIEF DESCRIPTION OF THE DRAWINGS

FIG. 1 is a cross section through the axis of the selector shaft and selector shaft return guide.

FIG. 2 is a view taken in the direction of the arrow II in FIG. 1 and indicates the selectable gear shift channels.

FIG. 3 is a cross section viewed radially showing in greater detail in an enlarged scale of the region of circle III in FIG. 1.

DESCRIPTION OF THE PREFERRED EMBODIMENT

Referring first to FIG. 1, the gear selector shaft 4, disposed in axially aligned bores 2 and 3 formed in the transmission casing 1, is rotatably and axially displaceable. A lever member 5 is secured to the selector shaft by a transversely directed pin 6. The flange surface 7 of lever 5 is provided with two groove tracks 8 offset angularly by 180°.

A holding member 9, with respect to which the selector shaft can move radially and axially, is disposed on the selector shaft facing lever member 5. The holding member is resiliently forced against the lever member by the action of a coil spring 10, which is supported on a spring plate 11 that is attached to the selector shaft by a clip 12. An extension 13 of the holding member 9 is formed with a radial slot into which a pin 15, secured in the transmission casing, projects to prevent the holding member from rotating and to permit it to move axially. Raised flange portions 16, on the face of the holding member adjacent the flange member and angularly aligned with the groove tracks 8, are formed with ball cups 17 within which balls 18 are fitted for rotation in the tracks.

The balls are engaged in the ball tracks on the lever member 5 and move in a peripheral direction along the tracks as the selector 4 is rotated to preselect a gear shift channel.

In FIG. 2, the gear shift channels are designated A, O and B. The neutral gear shift channel, O, has the third and fourth drive ratios located therein; channel B defines the first and second drive ratio channels; and channel A defines the fifth drive ratio and reverse drive ratio channels. The gear shift channels are laterally reversed with respect to the gear shift channels on the main selector lever because, as the main selector lever is pivoted to the left, the selector shaft 4 is pivoted to the right into the gear shift channel B. When the main selector lever is pivoted rightward, selector shaft 4 is pivoted leftward into the gear shift channel A.

Referring now to the enlarged cross section of FIG. 3, track 8 on the flange surface 7 has a slope that is different in each angular direction of the selector shaft. The ball 18 is located in the raised flange portion 16 and the ball cup 17 is formed in the holding member so that the ball rolls when there is relative movement of the lever and selector shaft with respect to the transmission casing and holding member 9. If the lever member is rotated in the direction of arrow B, the ball rolls up a slight uniform slope 20. This action requires a lesser expenditure of effort and indicates to the vehicle operator that the gear shift channel corresponding to the position of the first and second drive ratios has been preselected. If lever member 5 is rotated in the direction of arrow A, the ball rolls up steeper sloping surfaces 22, 24 and requires greater force. When the vehicle operator senses the need for this greater force, it is indicating that the gear shift channel corresponding to the fifth drive ratio and the reverse drive ratio has been preselected.

When the fifth speed or reverse drive are selected and engaged, the ball rests on surface 24; when the first or second speeds are selected and engaged, the ball rests on surface 20. Surfaces 20, 22, 24 through operation of spring 10 bias the selector shaft toward the second or third speed position illustrated in FIG. 3. The steep slope of surface 22 causes need for relative large shifting effort toward the fifth speed or reverse drive positions; the lesser slope of surface 24 facilitates engagement of the fifth speed or reverse drive after the operator experiences the increased effort.

The depth of the groove can be modified in a peripheral direction in various ways to provide correspondingly differing expenditures of effort for preselection of the shift channels where, for example, the transmission has more than three gear shift channels.

Having described the preferred embodiments of my invention, what I claim and desire to secure by U.S. Letters Patents is:

1. A selector shaft return guide for a multiple speed ratio transmission having multiple gear shift planes comprising:

selector shaft means mounted for rotation about its longitudinal axis for selecting the gear shift planes;

a lever member rotationally fixed to the selector shaft means, defining a track directed angularly about the axis of the selector shaft means having a track surface inclined with respect to said axis;

a holding member displaceable axially relative to the selector shaft means, defining a ball socket angularly and radially aligned with the lever member track;

ball means located in the ball socket for movement in the lever member track; and spring means for urging the holding member socket toward the lever member track, whereby the ball means is retained between said socket and said track.

2. The device of claim 1 wherein the selector shaft means is mounted for displacement parallel to its longitudinal axis for engaging the gear associated with the selected gear shift planes.

3. The device of claim 1 wherein the holding member is fixed against rotation and displaceable axially relative to the selector shaft means.

4. The device of claim 1 wherein the track of the lever member includes a first surface inclined with respect to the axis of the selector shaft means such that the ball means moves on said first surface against the resistance of the spring means as the selector shaft means rotates in a first direction;

a second surface inclined oppositely with respect to the axis of the selector shaft means from the inclination on said first surface such that the ball means moves on said second surface against the resistance of the spring means as the selector shaft means rotates in a second direction opposite the first direction.

5. The device of claim 1 wherein the gear shift planes selected by rotation of the selector shaft means include a neutral plane and at least one forward drive ratio plane, and wherein the track of the lever member defines a neutral position where the ball means is seated by the spring means and a first surface inclined with respect to the axis of the shift selector shaft such that the ball means moves on said first surface against the resistance of the spring means as the selector shaft means rotates in a first direction away from the neutral position.

6. The device of claim 5 wherein the track of the lever member includes a second surface inclined oppositely with respect to the axis of the selector shaft means from the inclination of the first surface and disposed on the angularly opposite side of the neutral position from the first surface such that the ball means moves on said second surface against the resistance of the spring means as the selector shaft means rotates in a second direction opposite the first direction and away from the neutral plane.

* * * * *